United States Patent
Kato

(10) Patent No.: US 11,676,765 B2
(45) Date of Patent: Jun. 13, 2023

(54) CERAMIC ELECTRONIC DEVICE AND MANUFACTURING METHOD OF THE SAME

(71) Applicant: TAIYO YUDEN CO., LTD., Tokyo (JP)

(72) Inventor: Yoichi Kato, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 17/354,129

(22) Filed: Jun. 22, 2021

(65) Prior Publication Data

US 2022/0028618 A1     Jan. 27, 2022

(30) Foreign Application Priority Data

Jul. 22, 2020   (JP) .............................. JP2020-125511

(51) Int. Cl.
| | |
|---|---|
| *H01G 4/30* | (2006.01) |
| *H01G 4/12* | (2006.01) |
| *H01G 4/012* | (2006.01) |

(52) U.S. Cl.
CPC ............... *H01G 4/30* (2013.01); *H01G 4/012* (2013.01); *H01G 4/1227* (2013.01)

(58) Field of Classification Search
CPC ........ H01G 4/012; H01G 4/12; H01G 4/1227; H01G 4/30
See application file for complete search history.

(56) References Cited

U.S. PATENT DOCUMENTS

| | | | | |
|---|---|---|---|---|
| 6,576,523 | B1* | 6/2003 | Honda ................... | C23C 14/042 257/303 |
| 2005/0214517 | A1* | 9/2005 | Sugimoto .............. | H01G 4/232 428/209 |
| 2014/0240895 | A1* | 8/2014 | Lee .......................... | H01G 4/12 29/25.42 |
| 2015/0116896 | A1 | 4/2015 | Inazuka et al. | |
| 2017/0236640 | A1* | 8/2017 | Kim ......................... | H01G 2/14 361/220 |
| 2022/0084752 | A1* | 3/2022 | Kato .................... | H01G 4/0085 |

FOREIGN PATENT DOCUMENTS

| | | | |
|---|---|---|---|
| JP | H09190946 A | * | 7/1997 |
| JP | 2002-043164 A | | 2/2002 |
| JP | 2004-186342 A | | 7/2004 |
| JP | 2015-026841 A | | 2/2015 |

* cited by examiner

*Primary Examiner* — Nathan Milakovich
(74) *Attorney, Agent, or Firm* — Chen Yoshimura LLP

(57) ABSTRACT

A ceramic electronic device includes a multilayer structure having a parallelepiped shape in which a first dielectric layer of which a main component is ceramic, a first internal electrode layer, a second dielectric layer of which a main component is ceramic, and a second internal electrode layer are stacked in this order, the first internal electrode layer being exposed to a first end face of the parallelepiped shape, the second internal electrode layer being exposed to a second end face of the parallelepiped shape, wherein in the multilayer structure, a conductive layer is provided on a side of the first end face, at a same level in a stacking direction as the second internal electrode, the conductive layer being spaced from the second internal electrode layer. A length of a gap between the second internal electrode layer and the conductive layer is 30 μm or less.

6 Claims, 15 Drawing Sheets

CERAMIC ELECTRONIC DEVICE AND MANUFACTURING METHOD OF THE SAME

FIELD

A certain aspect of the present invention relates to a ceramic electronic device and a manufacturing method of the ceramic electronic device.

BACKGROUND

A ceramic electronic device such as a multilayer ceramic capacitor has an active section in which each of a plurality of internal electrode layers and each of a plurality of ceramic layers are alternately stacked, and margin sections which protects side portions of the internal electrode layers. In the ceramic electronic device, steps are formed because the internal electrode layers not connected to an external electrode do not exist. Therefore, the ceramic electronic device has a barrel shape (for example, see Japanese Patent Application Publication No. 2015-026841). And so, it is thought that the steps are buried by ceramic paste or electrode paste (for example, see Japanese Patent Application Publication No. 2002-043164 and Japanese Patent Application Publication No. 2004-186342).

RELATED ART DOCUMENTS

Patent Documents

Japanese Patent Application Publication No. 2015-026841
Japanese Patent Application Publication No. 2002-043164
Japanese Patent Application Publication No. 2004-186342

SUMMARY OF THE INVENTION

When the steps are buried by electrode paste, the external electrodes must be insulated in the heights of the steps. It is therefore necessary to form an insulation space (gap) larger than a thickness of the electrode paste. However, when the large insulation space is formed between the external electrodes, a low density section of which a material filling degree is low is formed. Therefore, a crack may occur in the section because of thermal shock during a firing process or a reflow process.

The present disclosure has an objective of providing a ceramic electronic component and a manufacturing method of the same that are capable of suppressing occurrence of crack and improving insulation characteristic.

According to an aspect of the present invention, there is provided a ceramic electronic device including; a multilayer structure having a parallelepiped shape in which a first dielectric layer of which a main component is ceramic, a first internal electrode layer, a second dielectric layer of which a main component is ceramic, and a second internal electrode layer are stacked in a stacking direction in this order, the first internal electrode layer being exposed to a first end face of the parallelepiped shape, the second internal electrode layer being exposed to a second end face of the parallelepiped shape, wherein in the multilayer structure, a conductive layer is provided on a side of the first end face, at a same level in the stacking direction as the second internal electrode, the conductive layer being spaced from the second internal electrode layer, and wherein a length of a gap between the second internal electrode layer and the conductive layer is 30 μm or less.

In the above-described ceramic electronic device, said multilayer structure may be provided in a plurality, and the plurality of multilayer structures may be stacked in the stacking direction. Further, two of the gaps next to each other in the stacking direction may be shifted in position with each other in a lateral direction in which the first end face is opposite to the second end face that is perpendicular to the stacking direction.

In the above-described ceramic electronic device, one of the following conditions (a)-(c) may be satisfied: (a) edges on a side of the first end face of two of the gaps next to each other in the stacking direction are shifted in position in the lateral direction relative to each other by 5 μm or more; (b) edges on a side of the second end face of the two of the gaps next to each other in the stacking direction are shifted in position in the lateral direction relative to each other by 5 μm or more; and (c) both (a) and (b) are satisfied.

In the above-mentioned ceramic electronic device, a number of the multilayer structure may be two or more. Two of the gap next to each other in a stacking direction may be shifted with each other in a direction in which the first end face is opposite to the second end face, when viewed along the stacking direction.

In the above-mentioned ceramic electronic device, at least one of edges on a side of the first end face and edges on a side of the second end face of two of the gap next to each other in a stacking direction may be shifted by 5 μm or more, when viewed along the stacking direction.

In the above-mentioned ceramic electronic device, at least one of edges on a side of the first end face and edges on a side of the second end face of two of the gap next to each other in a stacking direction may be shifted by a half of the length of the gap or more, when viewed along the stacking direction.

In the above-mentioned ceramic electronic device, a main component metal of the second internal electrode layer may be a same as a main component metal of the conductive layer.

According to another aspect of the present invention, there is provided a manufacturing method of a ceramic electronic device including: preparing a multilayer structure having a parallelepiped shape in which two or more units are stacked, each of the units having a structure in which a metal conductive paste is provided on a green sheet including a main component ceramic; and firing the multilayer structure, wherein, in the multilayer structure prepared before the firing, a plurality of first layers made of the metal conductive paste and a plurality of second layers made of the metal conductive paste are alternately stacked with the green sheet interposed therebetween in a stacking direction, wherein adjacent to an end face of the multilayer structure, each of the plurality of first layers has a gap of a length of 30 μm or less dividing the first layer along a lateral direction that is perpendicular to the stacking direction, the gap not reaching said end face, and wherein adjacent to the end face of the multilayer structure, each of the plurality of second layers has no gap dividing the second layer along the lateral direction.

In the above-mentioned manufacturing method, the gap may be formed by removing a part of the metal conductive paste with use of a laser.

With the present disclosure, it is possible to provide a ceramic electronic component and a manufacturing method of the same that are capable of suppressing occurrence of crack and improving insulation characteristics.

BRIEF DESCRIPTION OF THE DRAWINGS

FIG. 5B schematically illustrates a low density section and a height or the like;

DETAILED DESCRIPTION

A description will be given of an embodiment with reference to the accompanying drawings.

Figure 1:
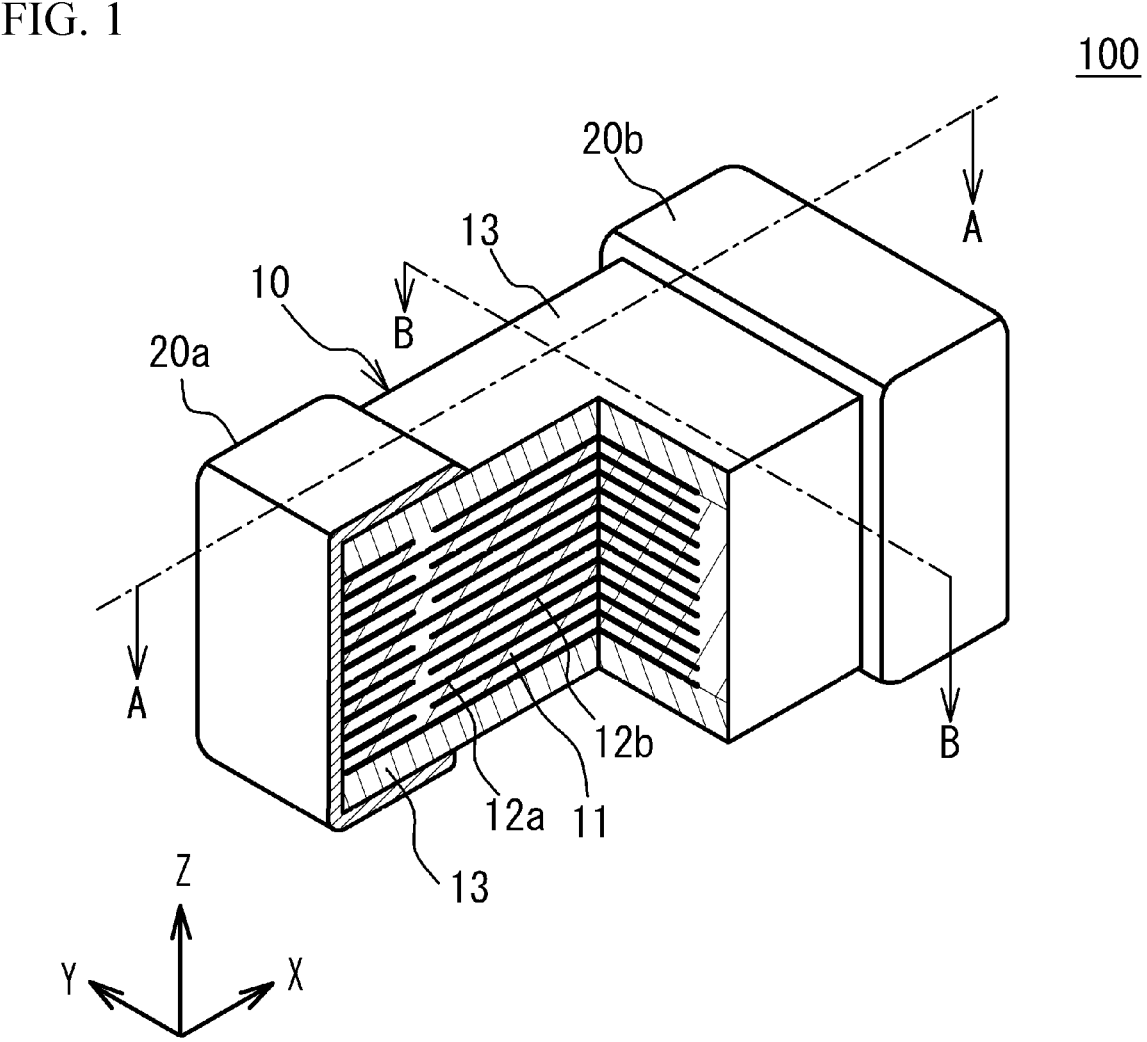
FIG. 1 illustrates a perspective view of a multilayer ceramic capacitor in which a cross section of a part of the multilayer ceramic capacitor is illustrated.
Figure 2A:
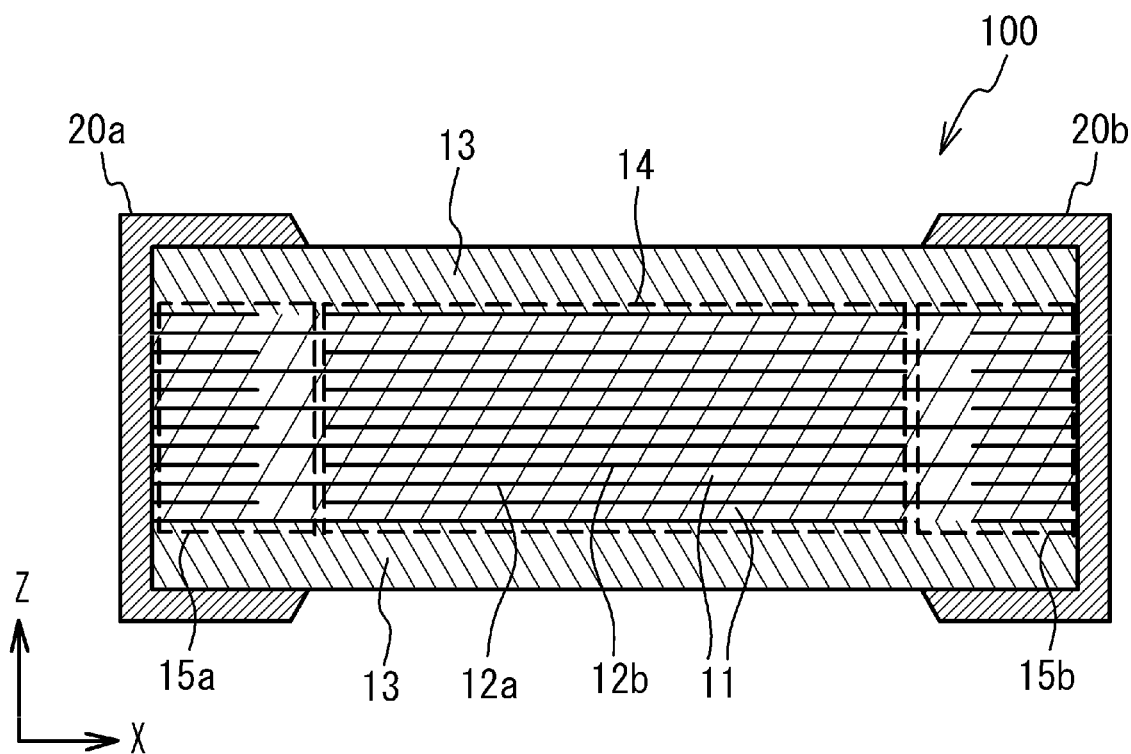
FIG. 2A and FIG. 2B illustrate a cross sectional view taken along a line A-A of FIG. 1.
Figure 2B:
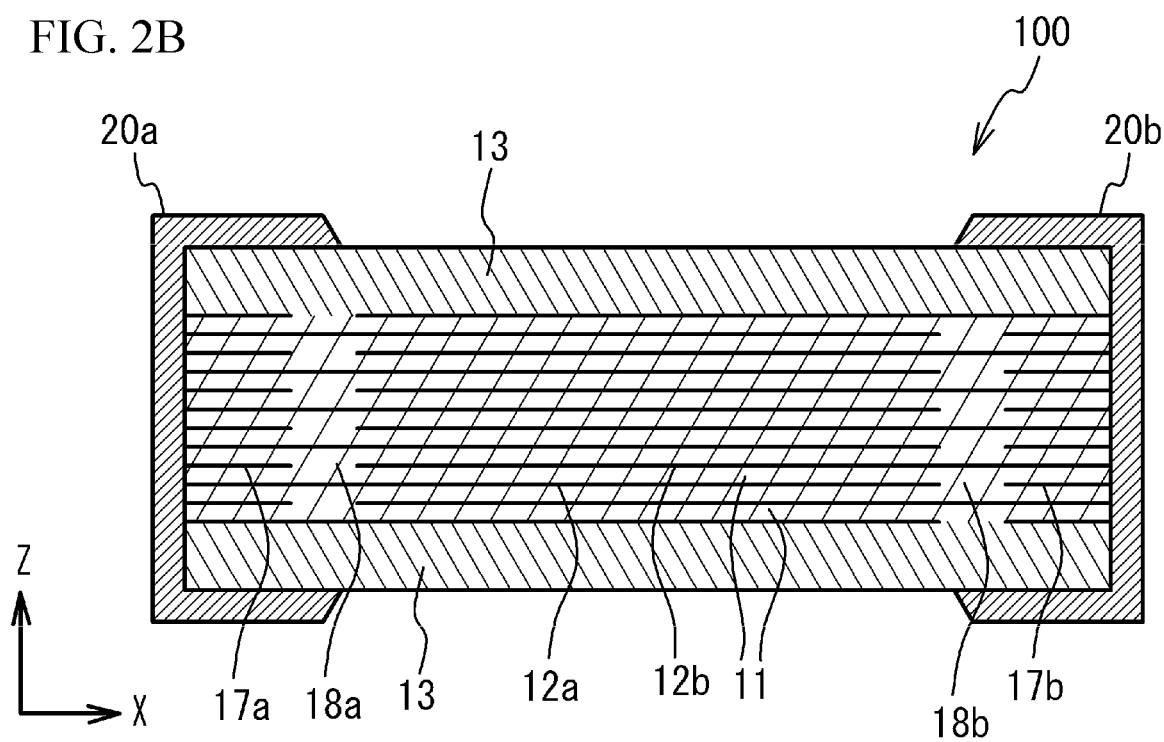
Figure 3:
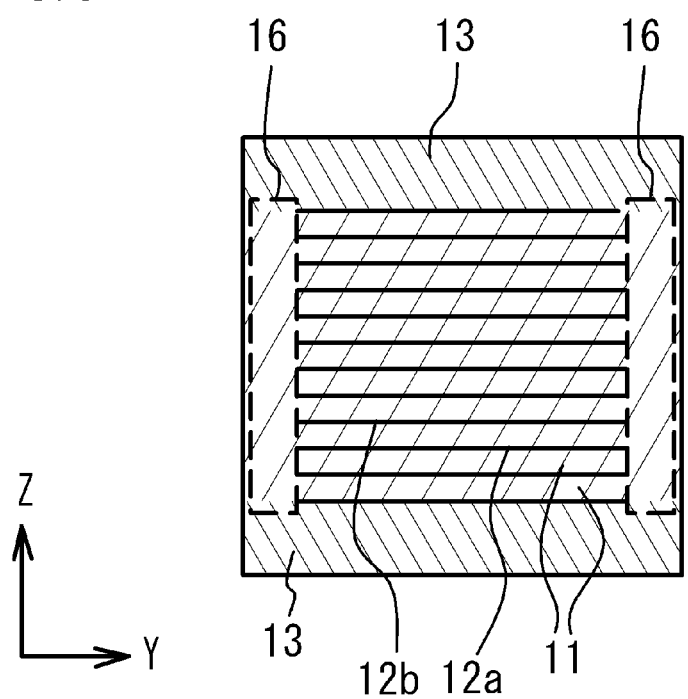
FIG. 3 illustrates a cross sectional view taken along a line B-B of FIG. 1.

(Embodiment) FIG. 1 illustrates a perspective view of a multilayer ceramic capacitor 100 in accordance with an embodiment, in which a cross section of a part of the multilayer ceramic capacitor 100 is illustrated. FIGS. 2A and 2B illustrate a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 with respect to a stacking direction are referred to as side faces. The external electrodes 20a and 20b extend to the upper face, the lower face and the two side faces of the multilayer chip 10. The external electrodes 20a and 20b are spaced from each other. In FIG. 1, an X-axis direction (first direction) is a length direction of the multilayer chip 10. In the X-axis direction, the two end faces of the multilayer chip 10 are opposite to each other. Moreover, in the X-axis direction, the external electrode 20a is opposite to the external electrode 20b. A Y-axis direction (second direction) is a width direction of the internal electrode layers. A Z-axis direction is the stacking direction. The X-axis direction, the Y-axis direction and the Z-axis direction are vertical to each other.

The multilayer chip 10 has a structure designed to have dielectric layers 11 and internal electrode layers alternately stacked. The dielectric layer 11 includes ceramic material acting as a dielectric material. The internal electrode layers include a base metal material. End edges of the internal electrode layers are alternately exposed to a first end face of the multilayer chip 10 and a second end face of the multilayer chip 10 that is different from the first end face. In the embodiment, the first end face is opposite to the second end face. The external electrode 20a is provided on the first end face. The external electrode 20b is provided on the second end face. Thus, the internal electrode layers are alternately electrically connected to the external electrode 20a and the external electrode 20b. Thus, the multilayer ceramic capacitor 100 has a structure in which a plurality of dielectric layers 11 are stacked and each two of the dielectric layers 11 sandwich the internal electrode layer. The internal electrode layer connected to the external electrode 20a is referred to as an internal electrode layer 12a (first internal electrode layer). The internal electrode layer connected to the external electrode 20b is referred to as an internal electrode layer 12b (second internal electrode layer). In a multilayer structure of the dielectric layers 11 and the internal electrode layers, the outermost layers in a stacking direction are respectively internal electrode layers. The upper face and the lower face of the multilayer structure that are the internal electrode layers are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers $12a$ and $12b$ is a base metal such as nickel (Ni), copper (Cu), tin (Sn) or the like. The internal electrode layers $12a$ and $12b$ may be made of a noble metal such as platinum (Pt), palladium (Pd), silver (Ag), gold (Au) or alloy thereof. An average thickness of each of the internal electrode layers $12a$ and $12b$ is, for example, 1 μm or less. The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure. An average thickness of each of the dielectric layers 11 is, for example, 1 μm or less. The number of the stacked internal electrode layers is, for example, 100 to 800.

As illustrated in FIG. 2A, a section, in which a set of the internal electrode layers $12a$ connected to the external electrode $20a$ face another set of the internal electrode layers $12b$ connected to the external electrode $20b$, is a section generating electrical capacity in the multilayer ceramic capacitor 100. And so, the section is referred to as a capacity section 14. That is, the capacity section 14 is a section in which the internal electrode layers next to each other that are connected to different external electrodes face each other.

A section, in which the internal electrode layers 12a connected to the external electrode 20a face each other without sandwiching the internal electrode layer 12b connected to the external electrode 20b, is referred to as an end margin 15a. A section, in which the internal electrode layers 12b connected to the external electrode 20b face each other without sandwiching the internal electrode layer 12a connected to the external electrode 20a is another end margin 15b. That is, the end margin is a section in which a set of the internal electrode layers connected to one external electrode face each other without sandwiching the internal electrode layer connected to the other external electrode. The end margins 15a and 15b are sections that do not generate electrical capacity in the multilayer ceramic capacitor 100.

As illustrated in FIG. 3, a section of the multilayer chip 10 from the two sides thereof to the internal electrode layers 12a and 12b is referred to as a side margin 16. That is, the side margin 16 is a section that covers respective lateral edges of the stacked internal electrode layers 12a and 12b that respectively extend toward the two side faces. The side margin 16 does not generate electrical capacity.

If the end margins 15a and 15b of the multilayer ceramic capacitor 100 do not contain dummy electrodes in the end margins 15a, 15b, steps are formed in the end margins 15a, 15b. Therefore, the multilayer ceramic capacitor 100 is deformed and exhibits a barrel shape. It is thought that the steps should be buried by dielectric layers or dummy electrodes, as a method of burying the steps.

Accordingly, in the present embodiment, as illustrated in FIG. 2B, the end margin 15a includes dummy electrode layers 17a (conductive layers), on the side of the external electrode 20a at the same level of the internal electrode layers 12b. The dummy electrode layers 17a are not connected with the internal electrode layer 12b. There is an interval between the dummy electrode layer 17a and the internal electrode layer 12b in the X-axis direction. The interval acts as an insulation gap 18a. The dummy electrode layers 17a may be connected with the external electrode 20a. The dummy electrode layers 17a may not be necessarily connected with the external electrode 20a. It is preferable that a main component metal of the dummy electrode layer 17a is the same as a main component metal of the internal electrode layer 12b. This is because the dummy electrode layer 17a and the internal electrode layer 12b can then be formed in the same process.

In the end margin 15b, dummy electrode layers 17b (conductive layers) are provided, on the side of the external electrode 20b at the same level as the internal electrode layers 12a. The dummy electrode layers 17b are not connected with the internal electrode layer 12a. There is an interval between the dummy electrode layer 17b and the internal electrode layer 12a in the X-axis direction. The interval acts as an insulation gap 18b. The dummy electrode layers 17b may be connected with the external electrode 20b. The dummy electrode layers 17b may not be necessarily connected with the external electrode 20b. It is preferable that a main component metal of the dummy electrode layer 17b is the same as a main component metal of the internal electrode layer 12a. This is because the dummy electrode layer 17b and the internal electrode layer 12a can then be formed in the same process.

Figure 4A:
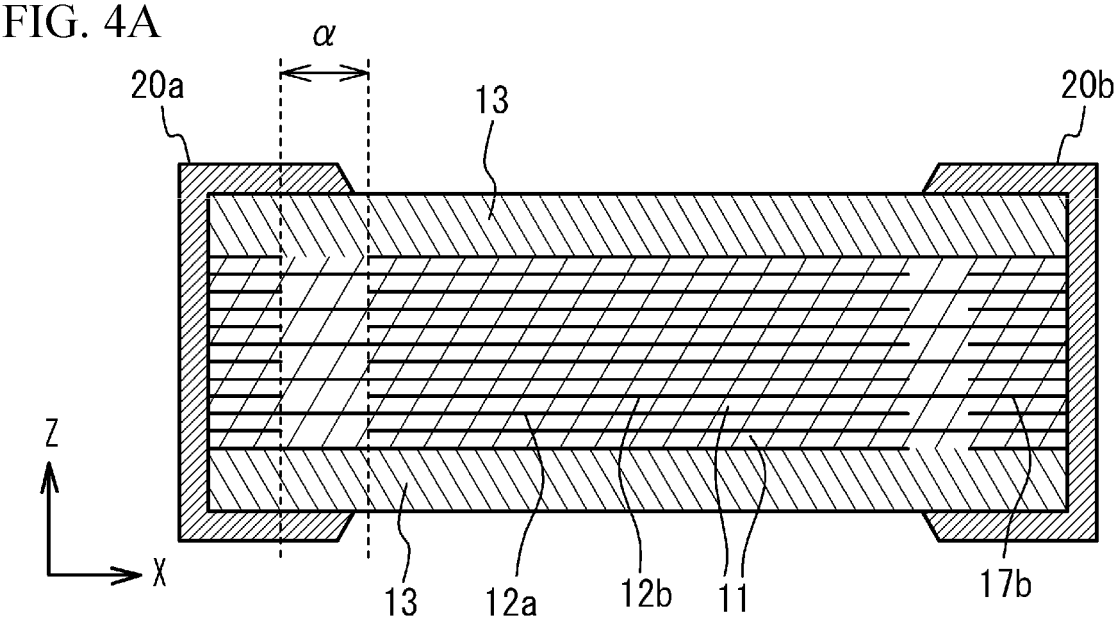
FIG. 4A illustrates a cross section in a case where a length of insulation gaps is more than 30 μm in an X-axis direction.
Figure 4B:
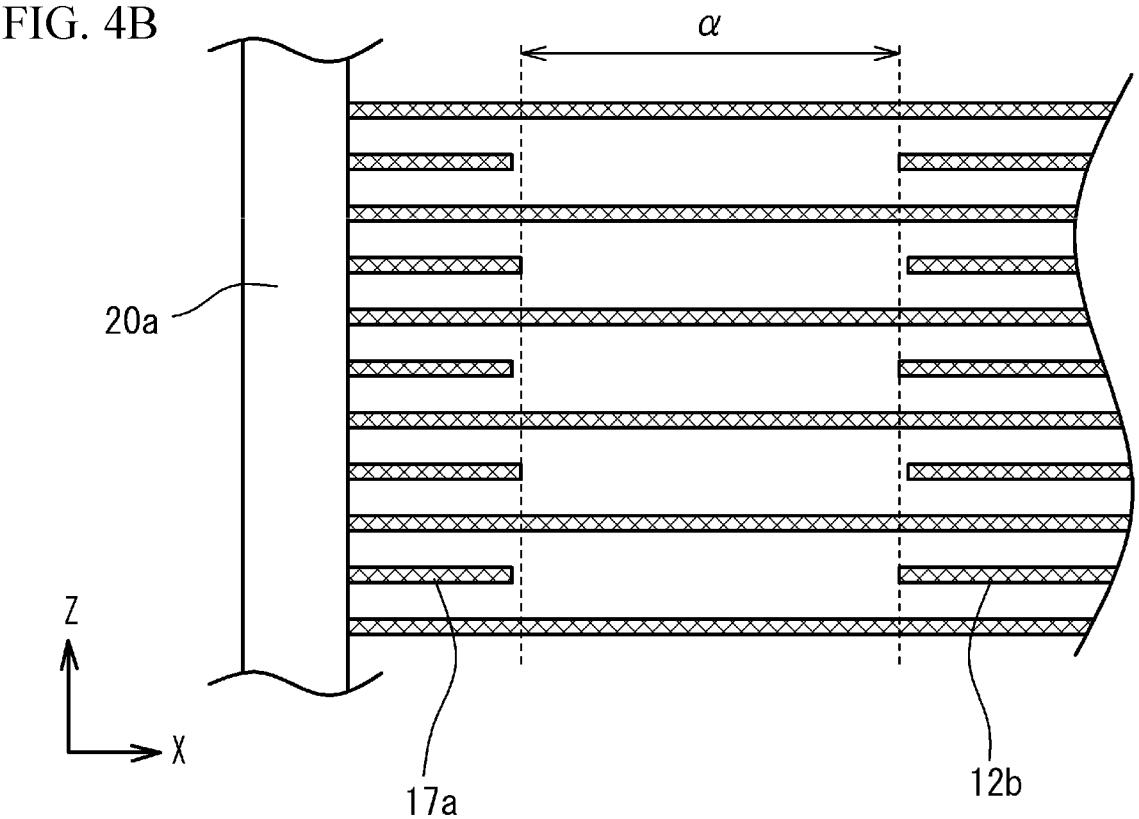
FIG. 4B illustrates a partially enlarged view of FIG. 4A.

A description will be given of a case where the insulation gaps 18a and 18b are excessively long in the X-axis direction in which the external electrode 20a is opposite to the external electrode 20b. FIG. 4A illustrates a cross section in a case where the length of the insulation gaps 18a and 18b is more than 30 µm in the X-axis direction. FIG. 4B illustrates a partially enlarged view of FIG. 4A.

Figure 5A:
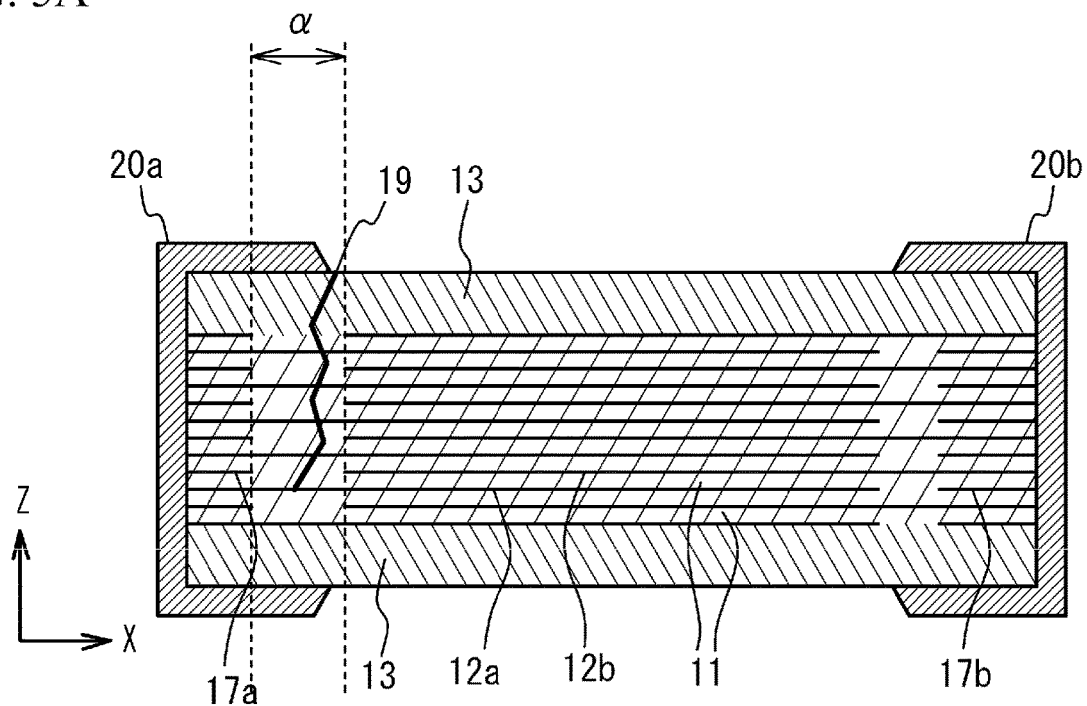
FIG. 5A illustrates a crack.

When the length of the insulation gap in the X-axis direction is more than 30 µm as illustrated in FIG. 4A and FIG. 4B, a low density section α in which the material filling density is low is excessively long. The low density section α is a section in which each insulation gap overlaps with each other when viewed along the stacking direction. Therefore, as illustrated in FIG. 5A, a crack 19 occurs in the low density section α because of the thermal shock during the firing process or the reflow process. This may deteriorate insulation characteristics.

Figure 5B:
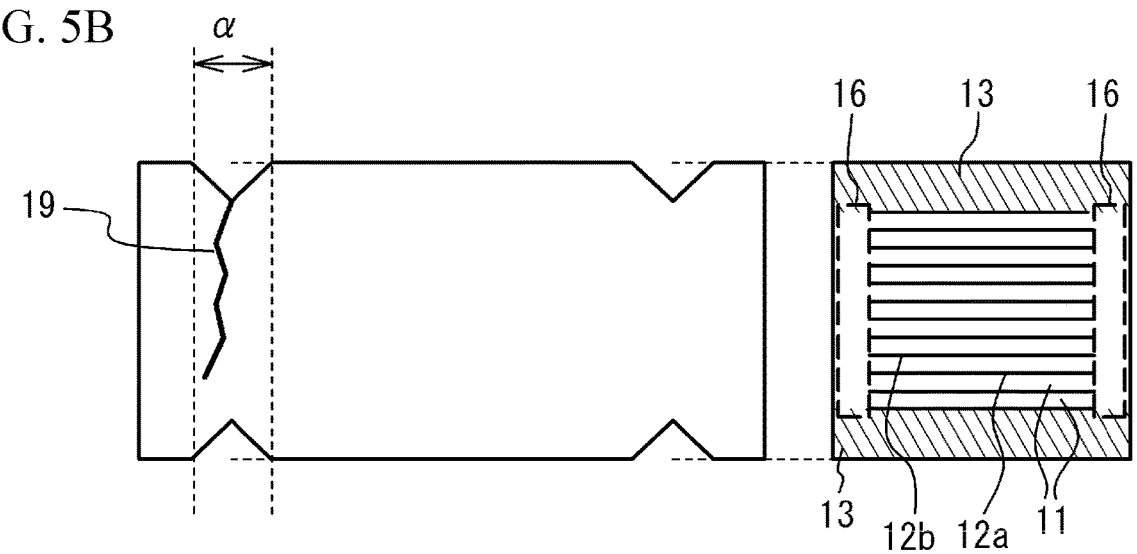

FIG. 5B schematically illustrates the low density section α. The low density section α is illustrated in the figure on the left side of FIG. 5B. The figure on the right side of FIG. 5B is given here to provide height reference to the figure on the left side. As illustrated in FIG. 5B, the low density section α contacts in the stacking direction because of the low density. The crack 19 may occur because of stress caused by the contraction.

Figure 6:
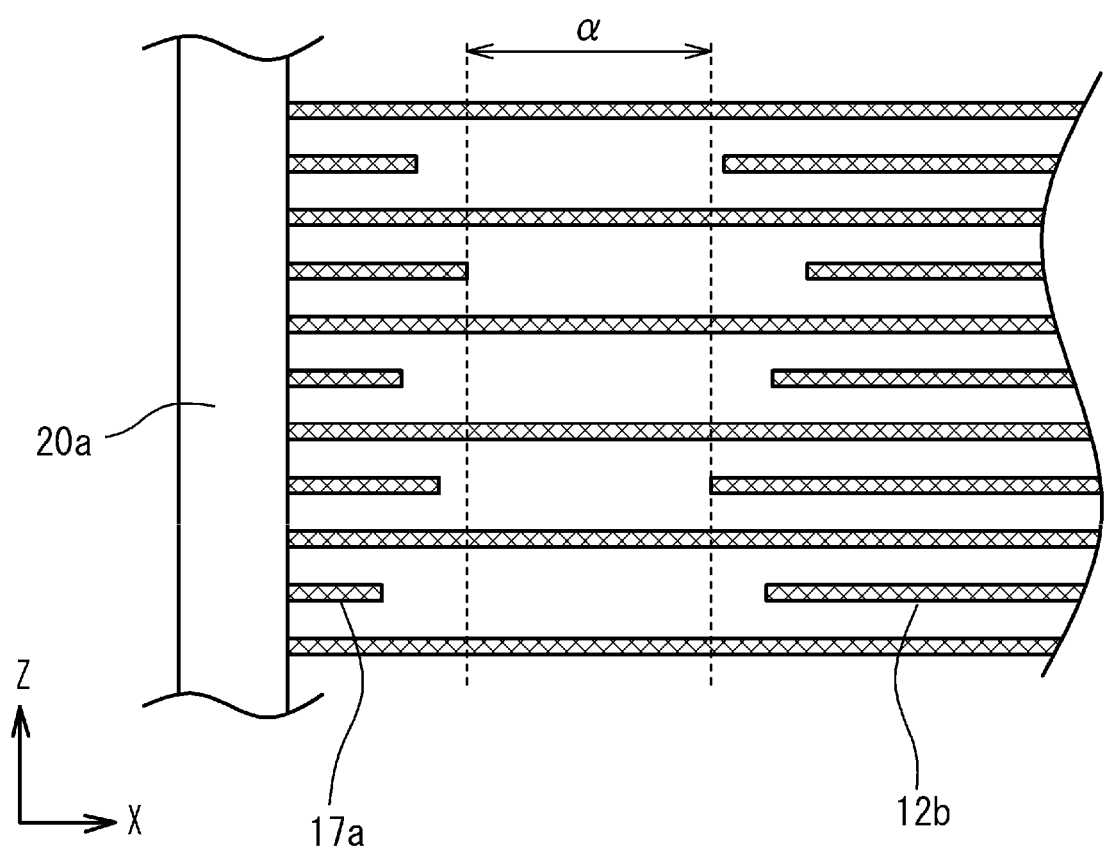
FIG. 6 illustrates a case where a length of an insulation gap is more than 30 μm, and lengths of insulation gaps are not equal to each other.

FIG. 6 illustrates a case where a length of an insulation gap in the X-axis direction is more than 30 µm, and lengths of insulation gaps are not equal to each other. In this case, each insulation gap is excessively long. Therefore, the low density section α in which the material filling density is low is excessively long in the X-axis direction.

Figure 7:
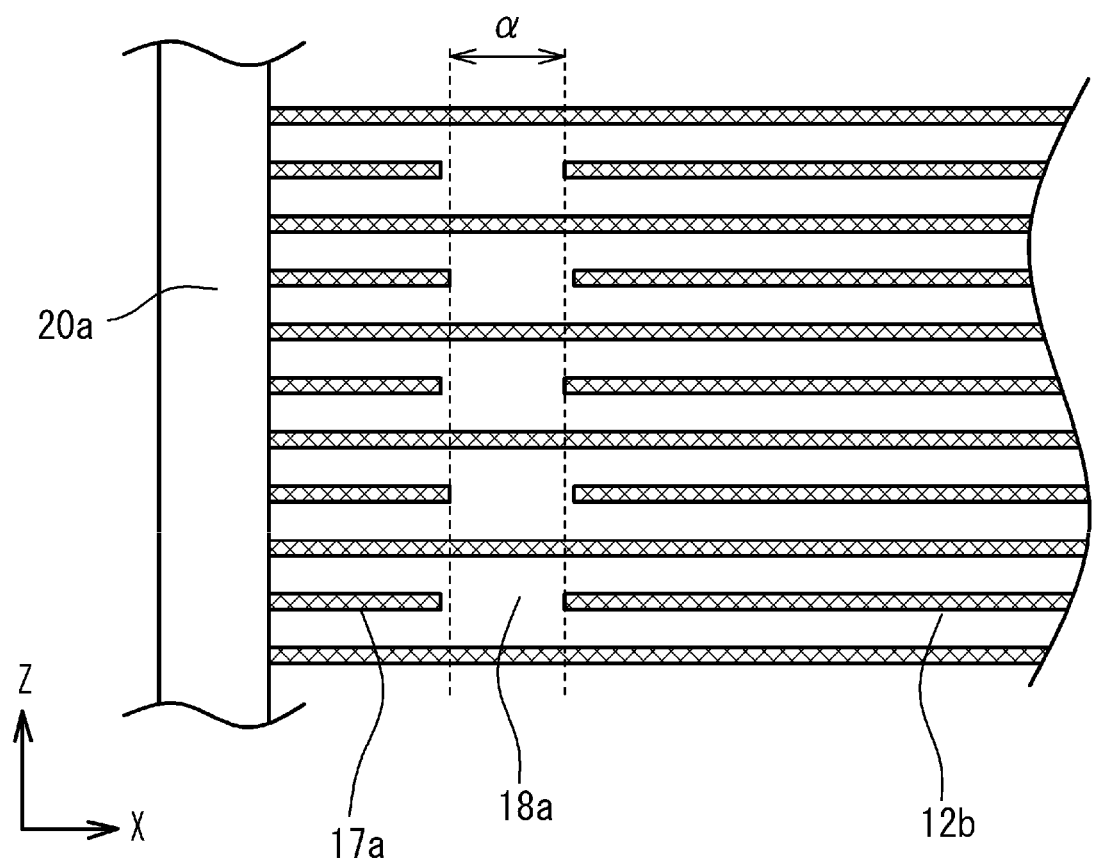
FIG. 7 illustrates an insulation gap of an embodiment.

In contrast, in this embodiment, as illustrated in FIG. 7, a length of at least one of the insulation gaps 18a in the X-axis direction is 30 µm or less. In this case, the low density section α in which the material filling density is low is sufficiently short in the X-axis direction. Therefore, even if a thermal shock during a firing process or a reflow process is applied, occurrence of the crack is suppressed. This improves insulation characteristics. It is preferable that two or more of the insulation gaps 18a have a length of 30 µm or less. It is more preferable that all of the insulation gaps 18a have a length of 30 µm or less. Further, at least one of the insulation gaps 18b has a length of 30 µm or less. It is preferable that two or more of the insulation gaps 18b have a length of 30 µm or less. It is more preferable that all of the insulation gaps 18b have a length of 30 µm or less.

Even if each of the insulation gaps has a length of more than 30 µm, it is possible to effectively shorten the low density section α if each of the insulation gaps is alternately shifted in the X-axis direction. However, when each of the insulation gaps is alternately shifted in the X-axis direction and has a length of 30 µm or more, the crack may still occur because a section in which the insulation gaps are dispersed is wide and the section does not withstand a stress. Therefore, when each of the insulation gaps has a length of more than 30 µm, it is difficult to release the stress even with the alternating structure.

When the insulation gaps 18a and 18b are smaller in the X-axis direction, the low density section α is shorter and the occurrence of the crack is more easily suppressed. It is preferable that the length of the insulation gaps 18a and 18b in the X-axis direction is 25 µm or less. It is more preferable that the length is 20 µm or less. On the other hand, when the insulation gaps 18a and 18b are excessively small in the X-axis direction, sufficient insulation characteristic may not be achieved. Therefore, it is preferable that the length of the insulation gaps 18a and 18b is 5 µm or more. It is more preferable that the length is 10 µm or more.

Figure 8:
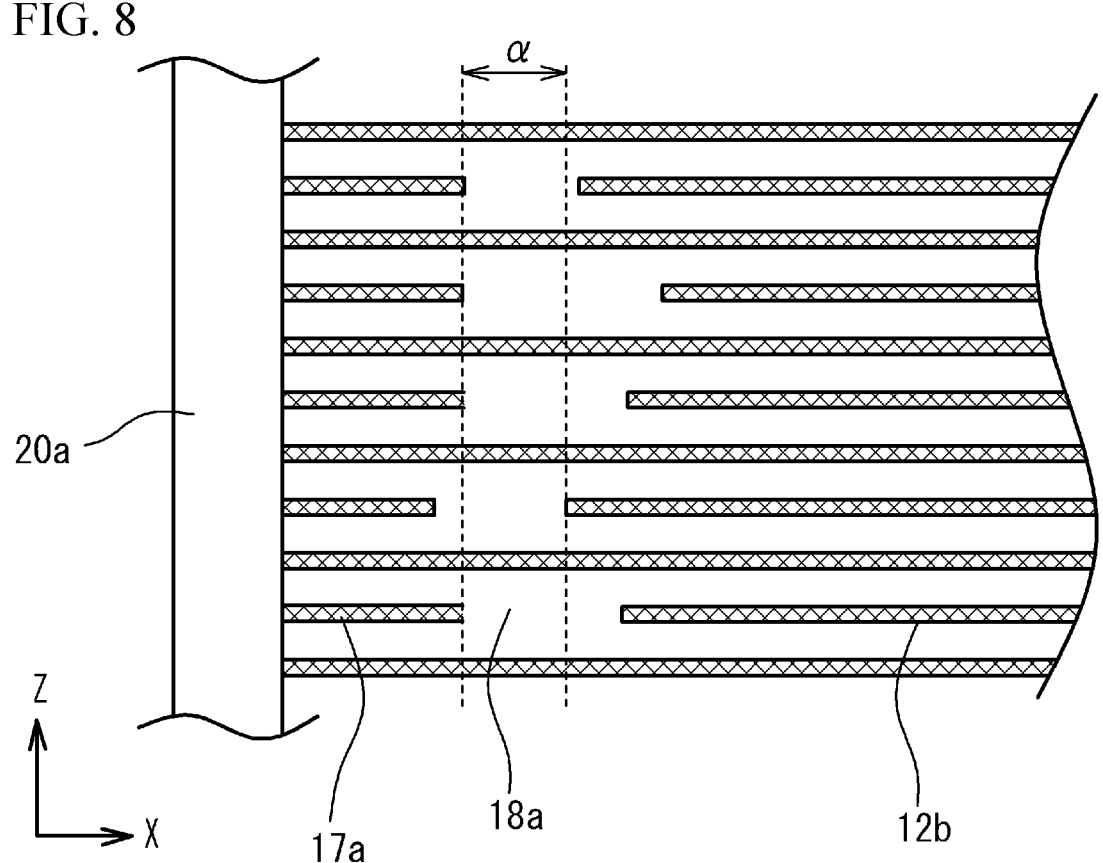
FIG. 8 illustrates an insulation gap of an embodiment.

It is further preferable that the positions of the insulation gaps 18a and 18b are not equal to each other in the X-axis direction. For example, as illustrated in FIG. 8, it is preferable that the positions of the insulation gaps 18a next to each other in the Z-axis direction are not the same with each other in the X-axis direction when viewed along the Z-axis direction. In this case, the positions of the insulation gaps are scattered in the X-axis direction. Therefore, the low density section α is short. It is therefore possible to further suppress the occurrence of the crack and improve the insulation characteristic. For example, it is preferable that at least one of the edges on the side of the external electrode 20a and the edges on the side of the external electrode 20b of the insulation gaps 18a and 18b next to each other in the Z-axis direction is shifted by 5 μm or more. It is more preferable that at least one of the edges on the side of the external electrode 20a and the edges on the side of the external electrode 20b of the insulation gaps 18a and 18b next to each other in the Z-axis direction is shifted by 10 μm or more. It is still more preferable that at least one of the edges on the side of the external electrode 20a and the edges on the side of the external electrode 20b of the insulation gaps 18a and 18b next to each other in the Z-axis direction is shifted by 15 μm or more. It is preferable that at least one of the edges on the side of the external electrode 20a and the edges on the side of the external electrode 20b of the insulation gaps 18a and 18b next to each other in the Z-axis direction is shifted by ½ or more of the lengths of the insulation gaps 18a and 18b in the X-axis direction.

It is preferable that an overlapping length viewed along the stacking direction of the insulation gap 18a and the insulation gap 18b next to each other in the Z-axis direction is 15 μm or less. It is more preferable that the overlapping length is 5 μm or less.

Figure 9:
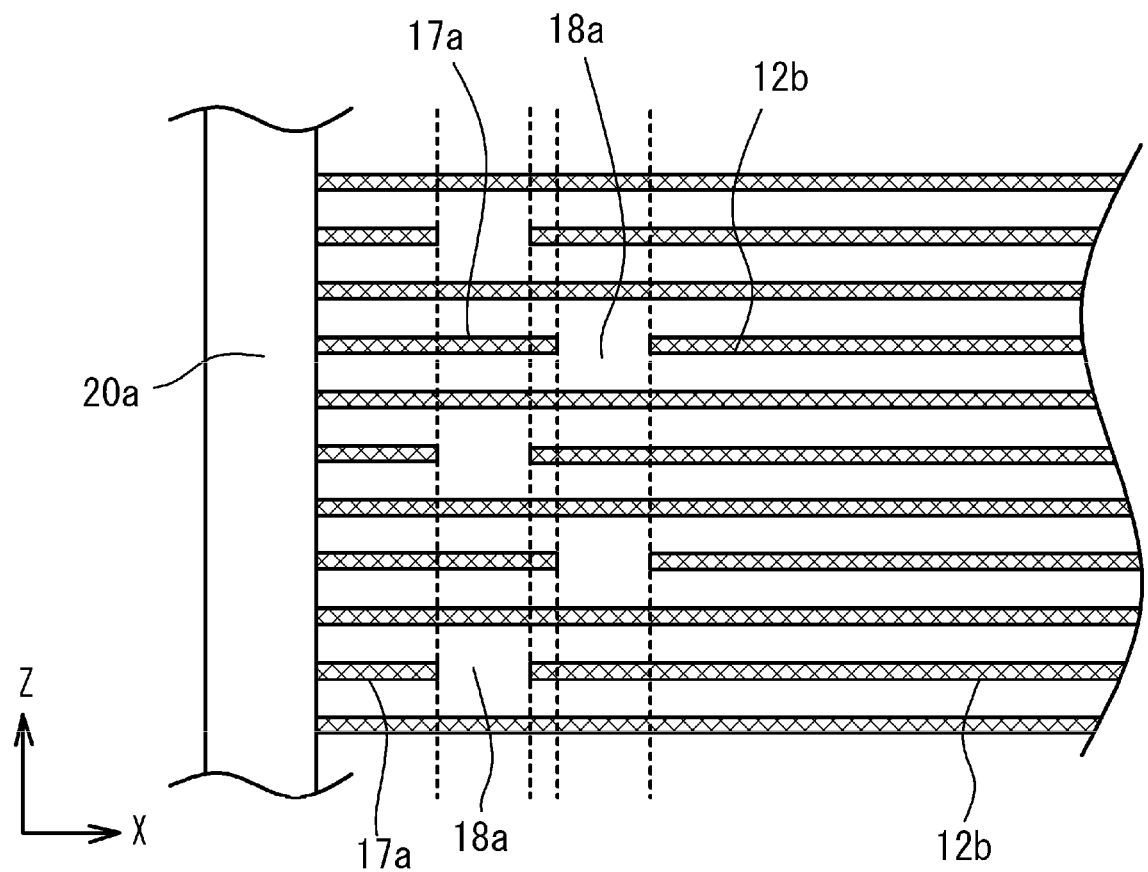
FIG. 9 illustrates an insulation gap of an embodiment.

It is even more preferable that the insulation gap 18a and the insulation gap 18b next to each other in the Z-axis direction dot not overlap with each other in the X-axis direction as illustrated in FIG. 9 when viewed along the stacking direction.

Figure 10:
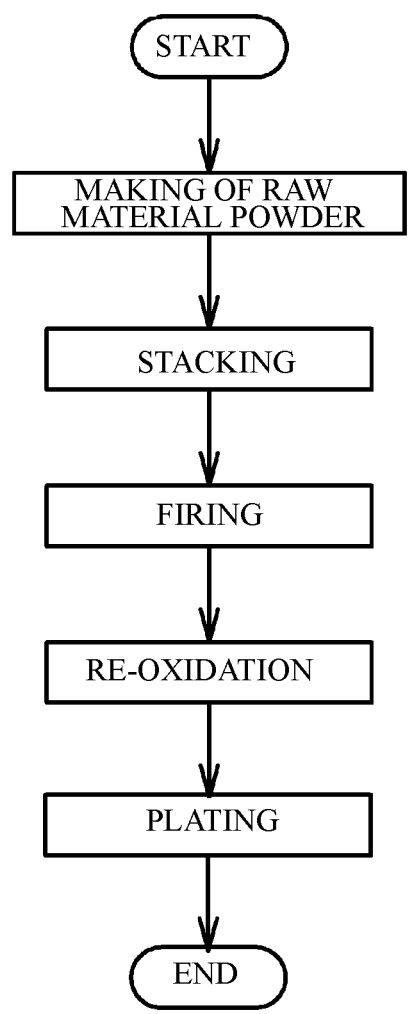
FIG. 10 illustrates a manufacturing method of a multilayer ceramic capacitor.

Next, a description will be given of a manufacturing method of the multilayer ceramic capacitor 100. FIG. 10 illustrates a manufacturing method of the multilayer ceramic capacitor 100.

(Making process of raw material powder) A dielectric material for forming the dielectric layer 11 is prepared. The dielectric material includes the main component ceramic of the dielectric layer 11. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiment may use any of these methods.

An additive compound may be added to resulting ceramic powders, in accordance with purposes. The additive compound may be an oxide of Zr (zirconium), Ca (calcium), Sr (strontium), Mg (magnesium), Mn (manganese), V (vanadium), Cr (chromium) or a rare earth element, or an oxide of Co (cobalt), Ni, Li (lithium), B (boron), Na (sodium), K (potassium) and Si, or glass.

Next, a margin material for forming the side margin 16 is prepared. The margin material includes the main component ceramic of the side margin 16. For example, $BaTiO_3$ powder is made as the main component ceramic. It is possible to make the $BaTiO_3$ by the same method as the dielectric material. An additive compound may be added to resulting $BaTiO_3$ powder, in accordance with purposes. The additive compound may be an oxide of Zr, Ca, Sr, Mg, Mn, V, Cr or a rare earth element, or an oxide of Co, Ni, Li, B, Na, K and Si, or glass.

Next, a cover material for forming the cover layer 13 is prepared. The cover material includes the main component ceramic of the cover layer 13. For example, $BaTiO_3$ powder is made as the main component ceramic. It is possible to make the $BaTiO_3$ by the same method as the dielectric material. An additive compound may be added to resulting $BaTiO_3$ powder, in accordance with purposes. The additive compound may be an oxide of Zr, Ca, Sr, Mg, Mn, V, Cr or a rare earth element, or an oxide of Co, Ni, Li, B, Na, K and Si, or glass. The above-mentioned margin material may be used as the cover material.

(Stacking process) Next, a binder such as polyvinyl butyral (PVB) resin, an organic solvent such as ethanol or toluene, and a plasticizer are added to the resulting dielectric material and wet-blended. With use of the resulting slurry, a strip-shaped dielectric green sheet 51 with a thickness of 0.8 μm or less is painted on a base material by, for example, a die coater method or a doctor blade method, and then dried.

Figure 11A:
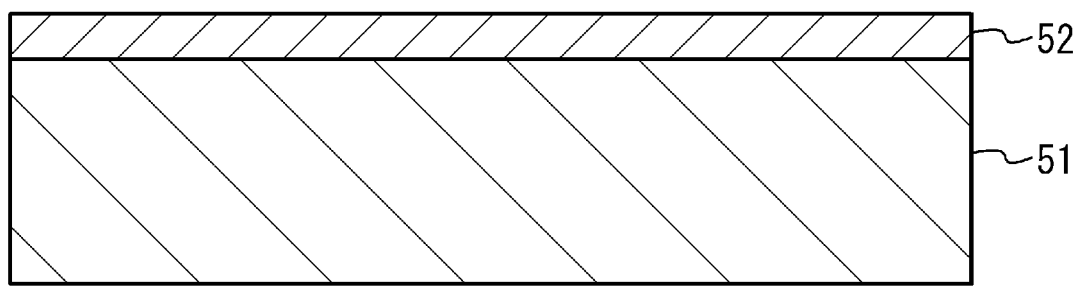
FIG. 11A and FIG. 11B illustrate a stacking process.

Next, as illustrated in FIG. 11A, metal conductive paste for forming an internal electrode is applied to the surface of the dielectric green sheet 51 by screen printing or gravure printing. The metal conductive paste includes an organic binder. Thus, a first pattern 52 for forming an internal electrode layer is provided. As co-materials, ceramic particles are added to the metal conductive paste. A main component of the ceramic particles is not limited. However, it is preferable that the main component of the ceramic particles is the same as that of the dielectric layer 11.

Figure 11B:
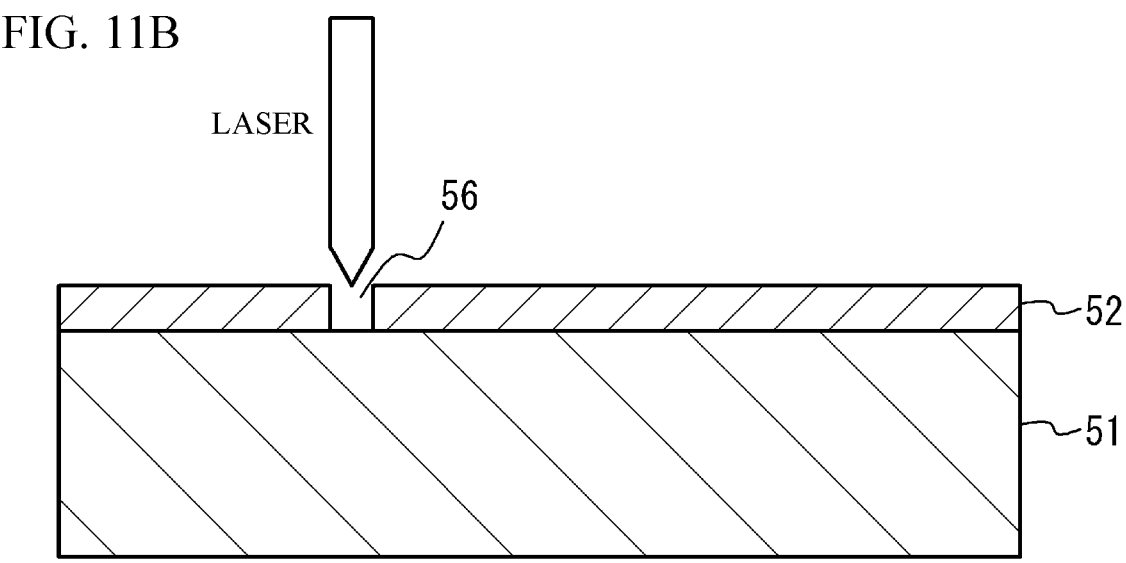
Figure 12A:
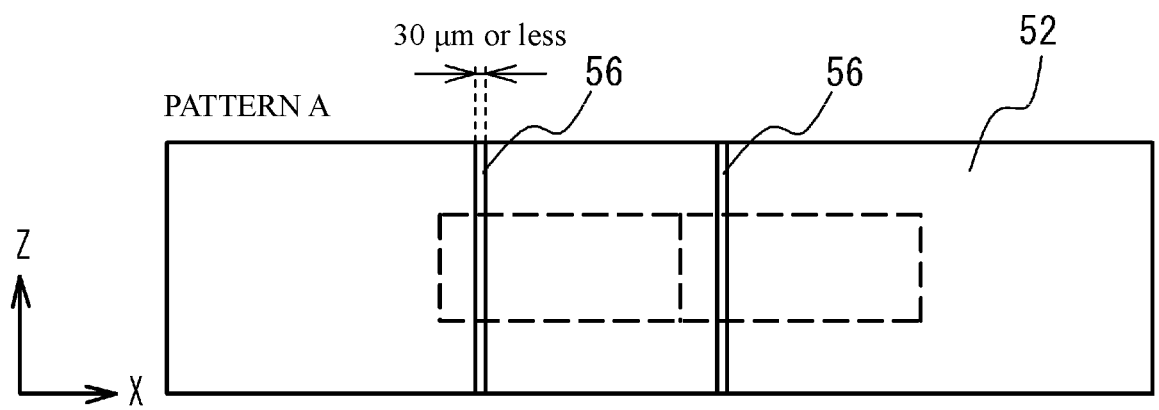
FIG. 12A illustrates an A pattern.
Figure 12B:
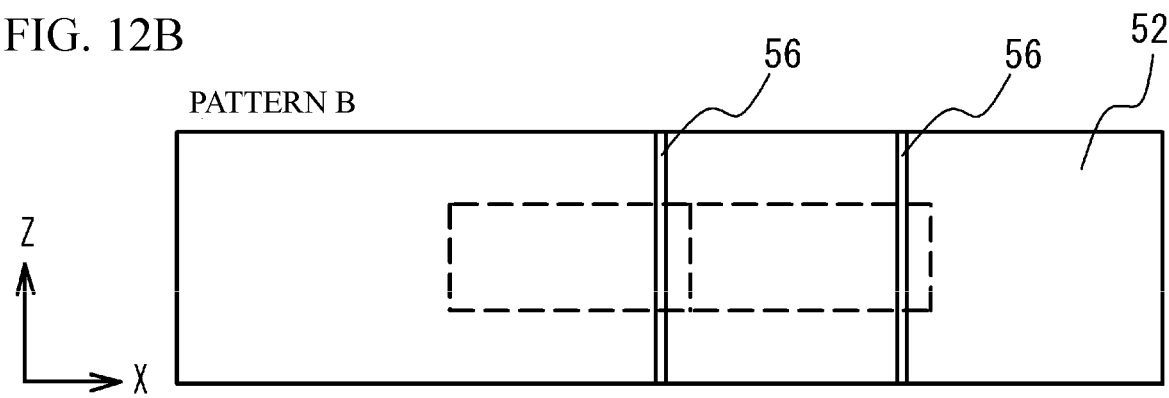
FIG. 12B illustrates a B pattern.

Next, as illustrated in FIG. 11B, a part of the first pattern 52 corresponding to the insulation gap is removed by a laser. Thus, a groove 56 is formed in the first pattern 52. FIG. 12A illustrates an A pattern which is one of two patterns. FIG. 12B illustrates a B pattern which is the other of the two patterns. In FIG. 12A and FIG. 12B, a broken line indicates a line for cutting in the following process.

A wavelength of a $CO_2$•YAG laser is long. Therefore, a spot diameter of the $CO_2$•YAG laser is large. It is therefore difficult to perform a micromachining. A wavelength of a UV (ultra violet) laser is within an absorption band of the ceramic (for example, barium titanate) of the dielectric green sheet 51. Therefore, if a UV laser is used, the dielectric green sheet 51 may be affected. It is therefore preferable that a visible light laser (blue light to green light) is used. The visible light permeates the dielectric green sheet 51. It is therefore suppress the influence on the dielectric green sheet 51. Because the wavelength of the visible light is adequately short, the spot diameter of the visible light laser can be made sufficiently small, which means that it is easy to perform the micromachining. Recently, a laser having a picosecond pulse can be used. It is therefore possible to suppress thermal damage on the dielectric green sheet 51 by using a picosecond pulse laser. In addition, in recent years, the diameter of the material included in the metal conductive paste is becoming progressively small, and the thickness of the first pattern 52 is being reduced. With the picosecond pulse laser, it is possible to remove the part of the dielectric green sheet 51 with low energy. Accordingly, the damage on the dielectric green sheet 51 is suppressed, and it is possible to directly process the metal conductive paste on the dielectric green sheet 51.

Figure 13:
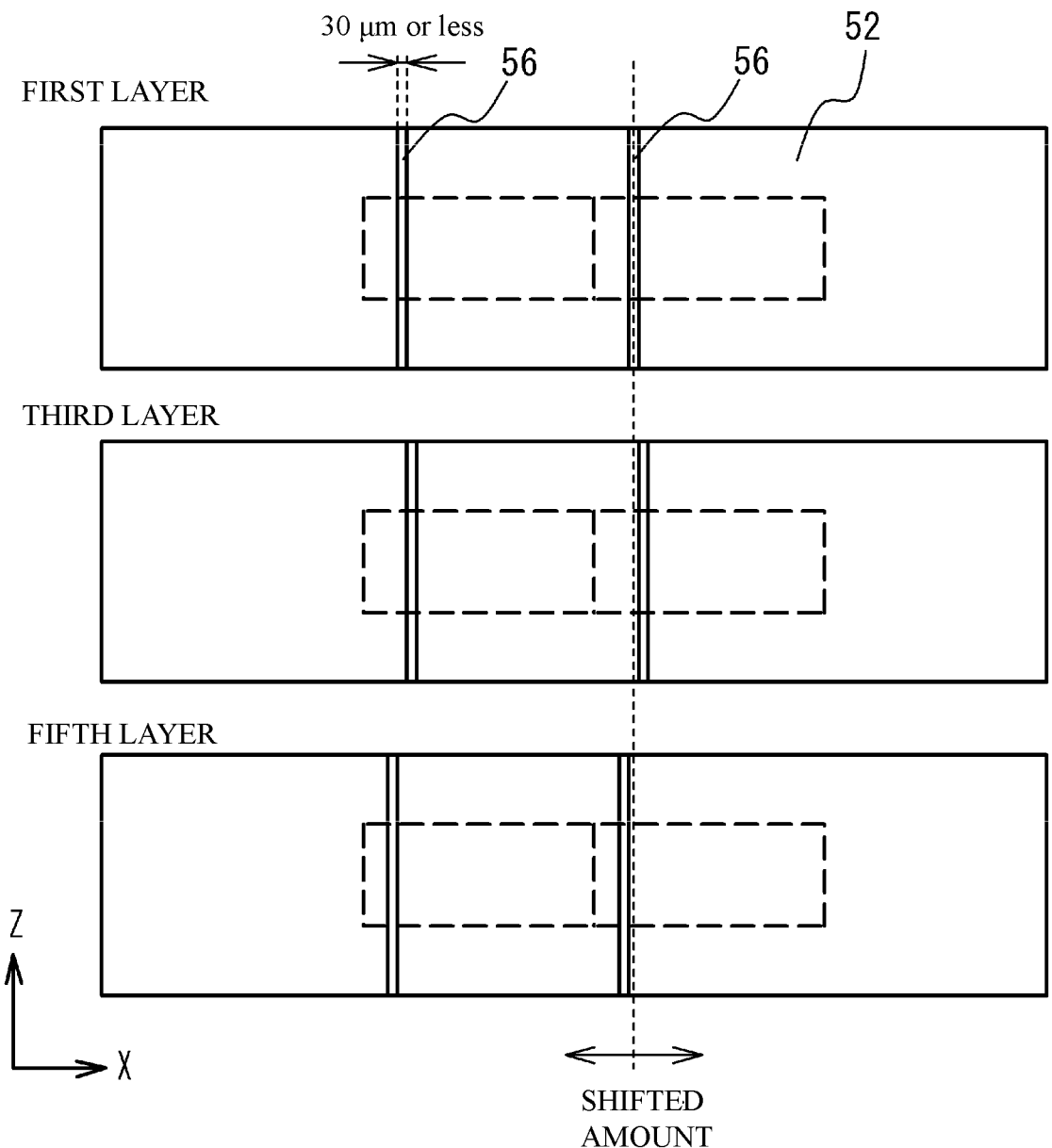
FIG. 13 illustrates a stacking process.

Next, each of a plurality of the A patterns and each of a plurality of the B patterns are alternately stacked. In this case, as illustrated in FIG. 13, the groove 56 of the A pattern which is a third layer (the third as counted together with the interposed B pattern included) may be shifted to one direction of the X-axis directions, with respect to the groove 56 of the A pattern which is a first layer. Next, the groove 56 of the A pattern which is a fifth layer (the fifth as counted together with the interposed B pattern included) may be shifted to the other direction of the X-axis directions. The groove 56 of the B pattern which is a fourth layer (the fourth as counted together with the interposed A pattern included) may be shifted to one direction of the X-axis directions, with respect to the groove 56 of the B pattern which is a second layer (the second as counted together with the interposed A pattern included). Next, the groove 56 of the B pattern which is a sixth layer (the sixth as counted together with the interposed A pattern included) may be shifted to the other direction of the X-axis directions. After that, the stacking is repeated in accordance with the number of stacked layers.

Figure 14A:
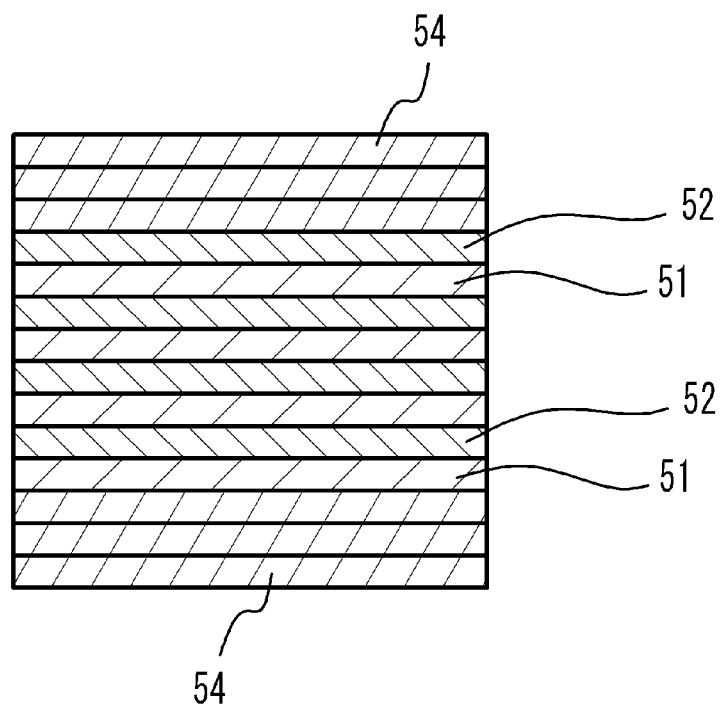
FIG. 14A and FIG. 14B illustrate a stacking process.

Next, a binder such as polyvinyl butyral (PVB) resin, an organic solvent such as ethanol or toluene, and a plasticizer are added to the cover material made in the raw material making process and wet-blended. With use of the resulting slurry, a strip-shaped cover sheet 54 with a thickness of 10 μm or less is painted on a base material by, for example, a die coater method or a doctor blade method, and then dried. A predetermined number (for example, 2 to 10) of the cover sheet 54 is stacked on an upper face and a lower face of the stacked dielectric green sheets 51, respectively, and is thermally clamped. After that, the multilayer structure is cut along the dotted line of FIG. 12A and FIG. 12B. FIG. 14A illustrates a cross section of the multilayer structure after the cutting.

Figure 14B:
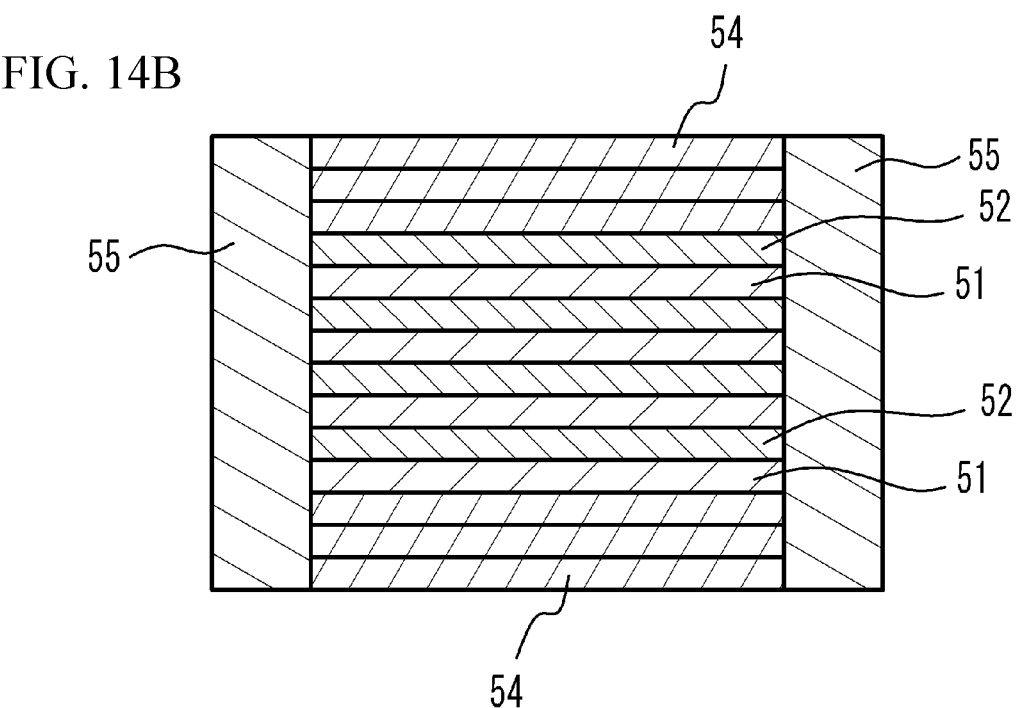

Next, as illustrated in FIG. 14B, a side margin sheet 55 made of the side margin paste is affixed to side faces of the multilayer structure. Alternatively, side margins may be formed by painting the side margin paste. The side margin paste may be margin paste obtained by adding a binder such as polyvinyl butyral (PVB) resin, an organic solvent such as ethanol or toluene, and a plasticizer to the margin material made in the raw material making process, and wet-blending with each other. The side margin paste formed on the side faces of the multilayer structure in which the dielectric green sheets 51 and the first patterns 52 are stacked corresponds to the side margins.

After that, metal conductive paste that will become the external electrodes 20a and 20b is applied to both side faces of the multilayer structure by a dipping method or the like and is dried. Thus, a ceramic multilayer structure is obtained.

(Firing process) The binder is removed from the ceramic multilayer structure in $N_2$ atmosphere. An Ni paste that will become the base layers of the external electrodes 20a and 20b is applied to the ceramic multilayer structure by a dipping method. The resulting ceramic multilayer structure is fired for ten minutes to 2 hours in a reductive atmosphere having an oxygen partial pressure of $10^{-5}$ to $10^{-8}$ atm in a temperature range of 1100 degrees C. to 1300 degrees C. In this manner, it is possible to manufacture the multilayer ceramic capacitor 100.

(Re-oxidizing process) After that, a re-oxidizing process may be performed in $N_2$ gas atmosphere in a temperature range of 600 degrees C. to 1000 degrees C.

(Plating process) After that, by a plating method, metal layers such as Cu, Ni, Sn or the like may be plated on the external electrodes 20a and 20b.

Figure 15A:
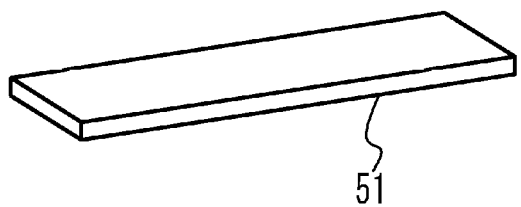
FIG. 15A to FIG. 15D illustrate a stacking process.
Figure 15B:
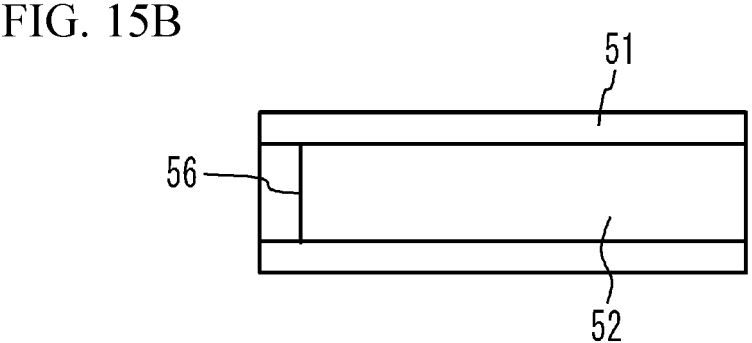

The side margin paste may be painted during the stacking of the A patterns and the B patterns. To do this, as illustrated in FIG. 15A, the dielectric green sheet 51 is prepared. Next, as illustrated in FIG. 15B, the first pattern 52 is provided on the surface of the dielectric green sheet 51 by printing the metal conductive paste for forming internal electrode including organic binder, with use of a screen printing or a gravure printing. A part of the first pattern 52 corresponding to the insulation gap is removed by a laser or the like. Thus, the groove 56 is formed in the first pattern 52.

Figure 15C:
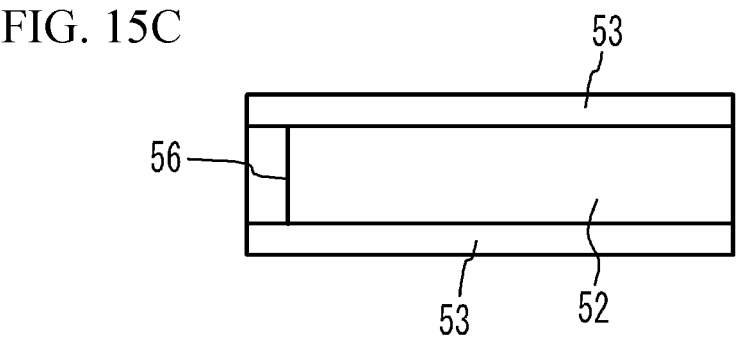

Next, as illustrated in FIG. 15C, the margin paste is printed on a part of the upper face of the dielectric green sheet 51 where the first pattern 52 is not printed. Thus, a second pattern 53 is provided, burying a step formed by the first pattern 52.

Figure 15D:
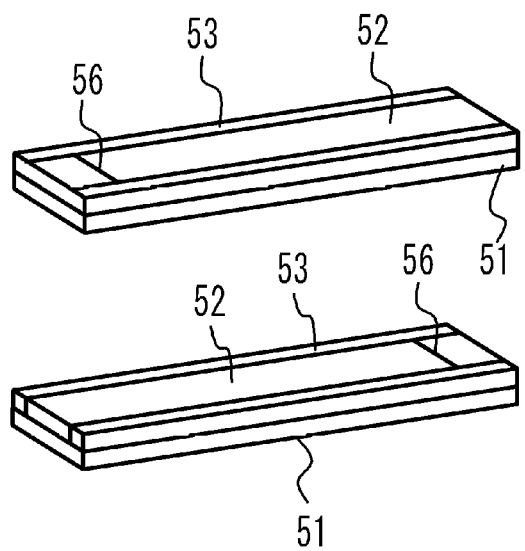

After that, as illustrated in FIG. 15D, the dielectric green sheets 51, the first patterns 52 and the second patterns 53 are stacked so that respective edges of the internal electrode layers 12a and respective edges of the internal electrode layers 12b are alternately connected to the external electrode 20a and the external electrode 20b, respectively. In this case, each of the grooves 56 may be shifted in the X-axis direction.

In the embodiments above, the multilayer ceramic capacitor is described as an example of ceramic electronic devices. However, the embodiments are not limited to the multilayer ceramic capacitor. For example, the embodiments may be applied to another electronic device such as varistor or thermistor.

Working Examples

The multilayer ceramic capacitors in accordance with the embodiment were made and the property was measured.

(Example 1) An additive was added to barium titanate powder. The additive and the barium titanate powder were sufficiently wet-blended and crushed in a ball mill. Thus, a dielectric material was made. An additive was added to barium titanate powder. The additive and the barium titanate powder were sufficiently wet-blended and crushed in a ball mill. Thus, a margin material was made. An additive was added to barium titanate powder. The additive and the barium titanate powder were sufficiently wet-blended and crushed in a ball mill. Thus, a cover material was made.

Butyral-based material acting as an organic binder, and toluene and ethanol acting as a solvent were added to the dielectric material, and a doctor blade method was used to form the dielectric green sheet 51. After that, the first pattern 52 of metal conductive paste was printed on the dielectric green sheet 51. Next, a part of the first pattern 52 corresponding to the insulation gap was removed by a laser or the like. Thus, the A pattern illustrated in FIG. 12A and the B pattern illustrated in FIG. 12B were formed. The length of the insulation gap in the X-axis direction was 25 μm. Next, each of the A patterns and each of the B patterns were alternately stacked. In this case, the position of each part of the A patterns corresponding to the insulation gap was matched with each other. The position of each part of the B patterns corresponding to the insulation gap was matched with each other. That is, the shifted amount of the insulation gap was 0 μm. However, there was a gap of ±1 μm occurred because of the stacking inaccuracy. The total number of the A patterns and the B patterns was 200.

Next, a binder such as polyvinyl butyral (PVB) resin, an organic solvent such as ethanol or toluene, and a plasticizer were added to the cover material made in the raw material making process and wet-blended. With use of the resulting slurry, the cover sheet 54 was painted on a base and was dried. A predetermined number of the cover sheet 54 was stacked on an upper face and a lower face of the stacked dielectric green sheets 51 and was thermally clamped. After that, the resulting multilayer structure was cut so that the cover sheet 54, the dielectric green sheet 51 and the first pattern 52 had the same width. The side margin sheets 55 made of the side margin paste were affixed to the side faces of the multilayer structure after the cutting. After that, the resulting multilayer structure was fired.

(Example 2) In an example 2, when the A patterns were stacked, the insulation gaps were alternately shifted by 5 μm in the X-axis direction. When the B patterns were stacked, the insulation gaps were alternately shifted by 5 μm in the X-axis direction. Other conditions were the same as those of the example 1.

(Example 3) In an example 3, when the A patterns were stacked, the insulation gaps were alternately shifted by 10 μm in the X-axis direction. When the B patterns were stacked, the insulation gaps were alternately shifted by 10 μm in the X-axis direction. Other conditions were the same as those of the example 1.

(Example 4) In an example 4, when the A patterns were stacked, the insulation gaps were alternately shifted by 15 μm in the X-axis direction. When the B patterns were stacked, the insulation gaps were alternately shifted by 15 μm in the X-axis direction. Other conditions were the same as those of the example 1.

(Comparative example) In a comparative example, the length of the insulation gaps in the X-axis direction was 50 μm. Other conditions were the same as those of the example 1.

(Analysis) With respect to each of the examples 1 to 4 and the comparative example, it was determined whether a crack occurred in the low density section after the firing. The crack occurrence ratio after the firing was a ratio of the samples in which the crack occurred, with respect to 100 samples. Table 1 shows the results. With respect to each of the examples 1 to 4 and the comparative example, the crack occurrence ratio after the reflow was a ratio of the samples in which the crack occurred, with respect to 100 samples in which the crack did not occurred in the firing.

TABLE 1

| | INSULATION GAP | SHIFTED AMOUNT | CRACK OCCURRENCE RATE AFTER FIRING | CRACK OCCURRENCE RATE AFTER REFLOW |
|---|---|---|---|---|
| EXAMPLE 1 | 25 μm | 0 μm | 45/100 | 5/100 |
| EXAMPLE 2 | 25 μm | 5 μm | 28/100 | 3/100 |
| EXAMPLE 3 | 25 μm | 10 μm | 9/100 | 2/100 |
| EXAMPLE 4 | 25 μm | 15 μm | 0/100 | 0/100 |
| COMPARATIVE EXAMPLE | 50 μm | 0 μm | 100/100 | — |

As shown in Table 1, in the comparative example, a crack occurred in all of the 100 samples after the firing. It is thought that this was because the low density section was excessively long because the length of the insulation gaps was 50 μm. On the other hand, the crack occurrence ratio after the firing was significantly reduced in the examples 1 to 4. It is thought that this was because the low density section was sufficiently short because the length of the insulation gaps was 30 μm or less. The crack occurrence ratio after the reflow was reduced in the examples 1 to 4. It is thought that this was because the low density section was sufficiently short because the length of the insulation gaps was 30 μm or less. In the example 4, the crack occurrence ratio after the firing and the crack occurrence ratio after the reflow were 0/100. It is thought that this was because the shifted amount was a half of the gap or more, and the low density section was scattered.

Although the embodiments of the present invention have been described in detail, it is to be understood that the various change, substitutions, and alterations could be made hereto without departing from the spirit and scope of the invention.

What is claimed is:

1. A ceramic electronic device comprising:
   a multilayer structure having a parallelepiped shape in which a first dielectric layer of which a main component is ceramic, a first internal electrode layer, a second dielectric layer of which a main component is ceramic, and a second internal electrode layer are stacked in a stacking direction in this order, the first internal electrode layer being exposed to a first end face of the parallelepiped shape, the second internal electrode layer being exposed to a second end face of the parallelepiped shape,
   wherein in the multilayer structure, a conductive layer is provided on a side of the first end face, at a same level in the stacking direction as the second internal electrode, the conductive layer being spaced from the second internal electrode layer,
   wherein a length of a gap between the second internal electrode layer and the conductive layer is 30 μm or less,
   wherein said multilayer structure is provided in a plurality, and the plurality of multilayer structures are stacked in the stacking direction,
   wherein two of the gaps next to each other in the stacking direction are shifted in position with each other in a lateral direction in which the first end face is opposite to the second end face that is perpendicular to the stacking direction, and
   wherein one of the following conditions (a)-(c) is satisfied:
   (a) edges on a side of the first end face of two of the gaps next to each other in the stacking direction are shifted in position in the lateral direction relative to each other by 5 μm or more and 15 μm or less;
   (b) edges on a side of the second end face of the two of the gaps next to each other in the stacking direction are shifted in position in the lateral direction relative to each other by 5 μm or more and 15 μm or less; and
   (c) both (a) and (b) are satisfied.

2. The ceramic electronic device as claimed in claim 1, wherein one of the following conditions (a)-(c) is satisfied:
   (a) edges on a side of the first end face of two of the gaps next to each other in the stacking direction are shifted in position in the lateral direction relative to each other by 10 μm or more;
   (b) edges on a side of the second end face of the two of the gaps next to each other in the stacking direction are shifted in position in the lateral direction relative to each other by 10 μm or more; and
   (c) both (a) and (b) are satisfied.

3. The ceramic electronic device as claimed in claim 1, one of the following conditions (a)-(c) is satisfied:
   (a) edges on a side of the first end face of two of the gaps next to each other in the stacking direction are shifted in position in the lateral direction relative to each other by a half of the length of one of the two of the gaps or more;
(b) edges on a side of the second end face of the two of the gaps next to each other in the stacking direction are shifted in position in the lateral direction relative to each other by a half of the length of one of the two of the gaps or more; and
(c) both (a) and (b) are satisfied.

4. The ceramic electronic device as claimed in claim 1, wherein a main component metal of the second internal electrode layer is a same as a main component metal of the conductive layer.

5. A manufacturing method of a ceramic electronic device comprising:
preparing a multilayer structure having a parallelepiped shape in which two or more units are stacked, each of the units having a structure in which a metal conductive paste is provided on a green sheet including a main component ceramic; and
firing the multilayer structure,
wherein, in the multilayer structure prepared before the firing, a plurality of first layers made of the metal conductive paste and a plurality of second layers made of the metal conductive paste are alternately stacked with the green sheet interposed therebetween in a stacking direction,
wherein adjacent to a first end face of the multilayer structure, each of the plurality of first layers has a gap of a length of 30 μm or less dividing the first layer along a lateral direction that is perpendicular to the stacking direction, the gap not reaching said first end face, and
wherein adjacent to the first end face of the multilayer structure, each of the plurality of second layers has no gap dividing the second layer along the lateral direction,
wherein two of the gaps next to each other in the stacking direction are shifted in position with each other in a lateral direction in which the first end face is opposite to a second end face of the multilayer structure that is perpendicular to the stacking direction, and
wherein one of the following conditions (a)-(c) is satisfied:
(a) edges on a side of the first end face of two of the gaps next to each other in the stacking direction are shifted in position in the lateral direction relative to each other by 5 μm or more and 15 μm or less;
(b) edges on a side of the second end face of the two of the gaps next to each other in the stacking direction are shifted in position in the lateral direction relative to each other by 5 μm or more and 15 μm or less; and
(c) both (a) and (b) are satisfied.

6. The method as claimed in claim 5, wherein the gap in each first layer is formed by removing a part of the metal conductive paste with use of a laser.

* * * * *